United States Patent Office 2,834,750
Patented May 13, 1958

2,834,750

BLENDS OF POLYSTYRENE AND HYDROGENATED POLYMERS OF CONJUGATED DIOLEFINS

Ival O. Salyer and James A. Herbig, Dayton, Ohio, assignors to Monsanto Chemical Company, St. Louis, Mo., a corporation of Delaware No Drawing. Application January 12, 1953
Serial No. 330,911

2 Claims. (Cl. 260—45.5)

This invention relates to improved polystyrene-type resins. A specific aspect of the invention pertains to the formation of polystyrene having improved impact strength and other properties.

Polystyrene is one of the most important plastics of commerce. Its many valuable properties are well known. However, one of its principal drawbacks is lack of ability to withstand impact shocks. There is need for improvement of this property as well as various other properties including tensile elongation and flexural deflection. It has been previously proposed to improve polystyrene by incorporating therein other polymeric materials. However, it was believed that such materials must be of the same general chemical nature as the polystyrene itself in order to be compatible and give satisfactory results. In the past certain rubbery materials have been incorporated in polystyrene, but their unsaturation has presented a serious problem in that the product undergoes deterioration to an undesired extent on aging. While the use of plasticizers of numerous types is known, this means of improving the impact strength and other physical properties of polystyrene lowers the heat distortion or softening point to such a degree as to make the product unsuitable for most applications.

An object of this invention is to provide improved polystyrene resins. Another object of the invention is to improve the impact strength of polystyrene. A further object is to provide a method for polymerizing styrene resulting in a resinous product of improved physical properties. Another object is to improve various physical properties of polystyrene made by mass, suspension, or emulsion polymerization. Yet another object is to improve the impact strength and other properties of polystyrene by incorporating therein an added material resulting in a product having good resistance to oxidation deterioration and thus good aging characteristics. Further objects and advantages of the invention will be apparent to those skilled in the art from the accompanying disclosure and discussion.

In accordance with one preferred embodiment of our invention, we have discovered that by forming an admixture of polystyrene with a hydrogenated synthetic rubbery polybutadiene, a product of greatly improved impact strength is obtained. One series of various types of satisfactory hydrogenated synthetic polybutadiene rubbers suitable for use in our invention are those available commercially under the trademark "Hydropol." While an ordinary commercial grade of polystyrene can be mechanically admixed with a hydrogenated polybutadiene, as by milling or extruding the two materials in known manner, with resulting improved properties in the product, we much prefer to dissolve or otherwise intimately admix the hydrogenated polybutadiene with monomeric styrene and subsequently effect polymerization to form a high molecular weight polystyrene-type resin. When the latter procedure is followed, the improvement in impact strength is particularly marked. A further improvement of either the mechanically mixed materials or the materials obtained by incorporating the hydrogenated polybutadiene prior to polymerization of the styrene, can be obtained by inclusion of a small amount of high molecular weight mineral oil; the mineral oil can be admixed with styrene prior to polymerization or can be incorporated by mechanical admixture with polystyrene plus hydrogenated polybutadiene.

By the term "hydrogenated polybutadiene" as used herein is meant a product obtained by catalytically hydrogenating a rubbery polymeric material prepared by the polymerization of a monomeric material comprising a $C_4$-$C_6$ aliphatic conjugated diolefin hydrocarbon, preferably 1,3-butadiene, said polymer having a second order transition temperature below 20° C., and said hydrogenation having been effected to such an extent that no more than 50 percent of the ethylenic unsaturation of said polymer remains in the hydrogenated material, said hydrogenation being further characterized by the absence of substantial degradation of the original polymer.

We prefer that the polymer to be hydrogenated be a rubbery polymer of monomeric material consisting of 1,3-butadiene and prepared by emulsion polymerization. However, as a variant within the broad aspects of the invention, 1,3-butadiene can be copolymerized with any of a large variety of copolymerizable ethylenically unsaturated organic compounds, for example, styrene, acrylonitrile, vinyl acetate, perfluoroethylene, methylmethacrylate, the quantity of such comonomer being limited to that resulting in a polymer having a second order-transition temperature below room temperature, i. e., below 20° C. The permissible quantity of such comonomer depends greatly upon the particular comonomer employed. Thus, considerable amounts of styrene, even up to 60 or 70 weight percent of styrene in the total monomeric material, can be used without increasing the second order transition temperature of resulting polybutadiene to room temperature; however, it is preferred that only relatively small amounts of styrene in the comonomers be used, e. g., up to 10 to 15 weight per cent styrene. In contrast, comonomers resulting in highly crystalline polymers, e. g., acrylonitrile, can be tolerated in amounts much lower than the upper permissible limit for styrene. Thus, 5 to 10 weight percent acrylonitrile should not be exceeded for best results. Those skilled in the art of polymerization, having had the benefit of the present disclosure, will know or will be able to determine by very simple tests permissible quantities of any particular ethylenically unsaturated copolymerizable monomer which can be used to advantage along with butadiene or other $C_4$-$C_6$ conjugated diolefins in making the polymer to be hydrogenated for use in the present invention. It will be appreciated that a final product obtained by preparing a mixture of polystyrene with a hydrogenated polymer will have properties affected to a considerable degree by any comonomer used in making the polymer. While the preferred diolefin to be polymerized is 1,3-butadiene, this material can be partially or completely replaced with any other aliphatic conjugated diolefin hydrocarbon containing 5 or 6 carbon atoms, e. g., isoprene, piperylene, 2,3-dimethylbutadiene.

The polymer to be hydrogenated is preferably made by any of the well-known emulsion polymerization techniques. Thus, one suitable example is a reaction mixture comprising 100 parts by weight 1,3-butadiene, 180 parts water, 5 parts emulsifying agent, for example, a potassium fatty acid soap, and a Redox catalyst combination, for example, iron pyrophosphate and cumene hydroperoxide with or without small amounts of a reducing sugar, and dodecyl mercaptan modifier in an amount giving rubbery polybutadiene product having a raw Mooney viscosity of 40. This emulsion system is subjected to polymerization under autogenous pressure at 60° F. until a conversion of 60 percent of the polybutadiene to polymer is obtained. Resulting latex, after vaporization of unreacted butadiene, can be coagulated by know means as by addition of electrolytes and the crumb washed.

The polybutadiene rubber so produced is dissolved in a suitable solvent, preferably methylcyclohexane, to give a solution containing say 5 weight percent polybutadiene. Into this solution is introduced nickel catalyst, e. g., Raney nickel or active nickel supported on kieselguhr, and the mixture contacted with agitation at 100 to 500° F. with hydrogen under a pressure of 100 to 1000 pounds per square inch for a time limited to give the desired extent of hydrogenation. The polymer before hydrogenation contains on an average between 0.8 and 0.95 ethylenic double bond per diene monomer unit, i. e., per four carbon atoms in the case of butadiene, and the hydrogenation is carried to an extent resulting in a residual unsaturation no more than half the initial unsaturation. In the preferred practice of our invention wherein hydrogenated polybutadiene is dissolved in styrene monomer which is then polymerized, we prefer to reduce the unsaturation to not more than 10 percent of that present in the polymer prior to hydrogenation. The hydrogenated polybutadiene is soluble in the solvent. At the end of the hydrogenation the catalyst is removed, as by filtration or other means, and the solvent is removed by evaporation. The resulting hydrogenated polybutadine is quite unlike the parent polymer. While it is still somewhat elastic, it is much harder, has a far greater tensile strength, and has the form of a tough white solid.

The foregoing description of one preferred method of preparing hydrogenated polybutadiene for use in accordance with the present invention is by way of example only. Thus, any other of the numerous known emulsion techniques and variants thereof can be used to polymerize 1,3-butadiene alone or with other monomeric materials as described herein. Any suitable organic solvent, preferably cycloaliphatic or aromatic solvents, although the latter, e. g., benzene, undergo hydrogenation, can be employed. The procedure described in U. S. Patent No. 2,046,257 can be used, wherein an aromatic solvent is used during the hydrogenation and the solvent itself undergoes hydrogenation to a hydroaromatic (naphthenic or cycloparaffinic) hydrocarbon. Hydrogenation catalysts other than nickel, for example, copper-chromia, platinum, palladium, can be used, although nickel is preferred because of its activity and cheapness. It is preferred that the polymerization of the diene hydrocarbon be effected in an emulsion system, inasmuch as rubbery polybutadiene polymers prepared by sodium catalyzed polymerization in solution, for example, tend to undergo degradation to a rather undesirable extent during the hydrogenation procedure.

A polybutadiene rubber of the class described herein can be hydrogenated as completely as possible to practically zero percent unsaturation and still be useful in the practice of our invention. There are indications that when the hydrogenated polybutadiene is to be mechanically admixed with the polystyrene, overall physical properties of the product are best when residual unsaturation is within the range of 15 to 40 percent of the original unsaturation. On the other hand, when the hydrogenated polybutadiene is incorporated in styrene monomer which is then polymerized, impact strength in particular increases markedly as the percentage residual unsaturation of the hydrogenated polybutadiene decreases down to 5 percent and even lower; it is presently preferred, however, that some unsaturation, for example, at least 1 to 2 percent of that present in the polybutadiene before hydrogenation, be present in the hydrogenated polymer used in this manner. While we do not desire to be bound by any theory as to how the advantages of our invention are obtained, it is thought that the product made by polymerizing styrene containing hydrogenated polybutadiene contains some hydrogenated polymer molecules as such and that probably a certain amount of interpolymerization also occurs between styrene and hydrogenated polybutadiene molecules with resultant formation of what can be called a graft polymer. In any event, as indicated above, properties of blends so formed are much superior to the same properties of blends formed by mere mechanical admixture of pre-formed polystyrene with hydrogenated polybutadiene. The term "blend" is used herein in a broad sense to include both mechanical blends and blends prepared by polymerizing styrene in the presence of hydrogenated polybutadiene.

The properties imparted to polystyrene by our invention are not caused merely by the fact that the hydrogenated polybutadiene is a saturated or partially saturated polymeric hydrocarbon material. This can be demonstrated for example by comparing a product made in accordance with this invention with a product made in exactly the same manner by substituting polyethylene for the hydrogenated polybutadiene. Properties of the hydrogenated polybutadiene containing polystyrene are much superior to those of the product containing the same amount of polyethylene incorporated in the same manner. The chemist will recognize that althuogh hydrogenated polybutadiene is an essentially linear high molecular weight polymer having at least a portion of original unsaturation removed by the hydrogenation treatment, the polymer chain has attached thereto numerous small side chains, presumably formed as a result of 1, 2 addition during the butadiene polymerization. This is further borne out by infra-red absorption spectra. Further, two polymeric materials, one made by hydrogenating rubbery polybutadiene to a residual unsaturation of 20 percent, and one made on the other hand by admixing a hydrogenated polybutadiene rubber having residual unsaturation of 40 percent with an equal quantity of polyethylene (which of course has essentially zero unsaturation) resulting in a mixture having an overall unsaturation of 20 percent, are not equivalent when used in the practice of our invention. Polystyrenes containing the two types of material discussed in the preceding sentence are further found to differ markedly in their properties, the better properties being in the polystyrene containing only hydrogenated polybutadiene with 20 percent residual unsaturation. It is also very probable that hydrogenated polybutadiene differs markedly from polyethylene and other long chain hydrocarbon polymers of various types in the extent of branching and cross-linking.

The percentage of hydrogenated polybutadiene to be employed in the product will of course be chosen with respect to the particular combination of physical properties to be desired. Broadly speaking, a quantity ranging from an amount sufficient to show some effect on the physical properties, say about 1 weight percent of the final product, up to 30 weight percent or higher is permissible. It has been found that in the case of mechanical blends of hydrogenated polybutadiene with preformed polystyrene, there is a rapid decrease in physical properties as the hydrogenated polybutadiene content is increased from an apparently optimum concentration of about 5 weight percent based on the total blend to a very limitedly compatible concentration at 20 percent. The mechanical mixtures are not the equivalents of mixtures prepared by polymerizing styrene containing hydrogenated polybutadiene, inasmuch as the product made by the latter procedure, which can be called a "polymerization blend," has much better physical properties at a given content of hydrogenated polybutadiene, and the compatibility is excellent up to 20 weight percent and above. Also, in the "polymerization blends," decrease in residual unsaturation of hydrogenated polybutadiene rubber results in increased impact strength at least down to very low amounts of residual unsaturation. Yet the same effect is not observed to any marked extent with mechanical mixtures, and presently the preferred unsaturation content of hydrogenated polybutadiene for use in mechanical mixtures is in the neighborhood of 10 to 30 percent residual unsaturation. In preparing "polymerization blends" by dissolving or otherwise intimately dispersing hydrogenated polybutadiene in styrene monomer and then polymerizing, an amount of hydrogenated polybutadiene based upon total material in the range of 2 to 20 weight percent is preferred and 5 to 10 weight percent is in most instances found to be best for good balance of the various physical properties.

In the preferred embodiments of our invention, for the most satisfactory results the polymerization of styrene containing intimately dispersed hydrogenated polybutadiene should be effected under such conditions as will result in (a) high degree of conversion of the styrene, measured by an alcohol solubles content of less than 5 weight percent, and (b) high molecular weight polymer having a molecular weight of between 50,000 and 100,000 on the Staudinger scale although somewhat lower or higher molecular weights, for instance within the range of 30,000 to 150,000, are permissible. A large variety of reaction conditions or procedures for the polymerization can be employed with satisfactory results. Thus, the polymerization can be carried out in the absence of any added catalyst. Any of the well-known styrene polymerization catalysts, such as organic peroxides, organic hydroperoxides, azo compounds and the like can be used in small quantities. The polymerization can be effected at atmospheric or superatmospheric pressures.

One preferred embodiment of our invention comprises subjecting styrene containing hydrogenated polybutadiene in amounts such as to improve the impact strength of the polystyrene, to polymerization at a pressure of at least 5,000 pounds per square inch for a time to effect greater than 95 percent conversion to high molecular weight polystyrene.

The invention can be carried out without the use of an added catalyst, or sufficient catalyst can be employed to give a desired reaction rate. Suitable catalysts are of the free radical promoting type, principal among which are peroxide-type polymerization catalysts, and azo-type polymerization catalysts. Those skilled in the art are now fully familiar with a large number of peroxide-type polymerization catalysts and a suitable one can readily be chosen by simple trial. Such catalysts can be inorganic or organic, the latter having the general formula: R'OOR'', wherein R' is an organic radical and R'' is an organic radical or hydrogen. These compounds are broadly termed peroxides, and in a more specific sense are hydroperoxides when R'' is hydrogen. R' and R'' can be hydrocarbon radicals or organic radicals substituted with a great variety of substituents. By way of example, suitable peroxide-type catalysts include: benzoyl peroxide, ditertiary butyl peroxide, tertiary butyl hydroperoxide, diacetylperoxide, diethylperoxycarbonate, dimethylphenylhydroperoxymethane (known also as cumene hydroperoxide) among the organic peroxides; hydrogen peroxide, potassium persulfate, perborates and other "per" compounds among the inorganic peroxides. The azo-type polymerization catalysts are also well-known to those skilled in the art. These are characterized by the presence in the molecule of the group —N=N— wherein the dangling valences can be attached to a wide variety of organic radicals, at least one, however, preferably being attached to a tertiary carbon atom. By way of example of suitable azo-type catalysts can be mentioned $\alpha,\alpha'$-azodiisobutyronitrile, p-bromobenzenediazonium fluoborate, N-nitroso-p-bromoacetanilide, azomethane, phenyldiazonium halides, diazoaminobenzene, p-bromobenzenediazonium hydroxide, p-tolyldiazoaminobenzene. The peroxy-type or azo-type polymerization catalyst is used in small but catalytic amounts, which are generally not in excess of one percent by weight based upon the monomeric material. A suitable quantity is often in the range of 0.05 to 0.5 percent by weight.

The foregoing discussion of degree of conversion of styrene, molecular weight of polystyrene, use of catalysts, and presence of comonomers with the styrene, applies to the case of polymerizing styrene monomer containing hydrogenated polybutadiene and also to the case of polymerizing styrene to form polystyrene per se, which is then mechanically mixed with hydrogenated polybutadiene.

While this invention is directed particularly to the homopolymerization of styrene, it is permissible and not outside the broad scope of the invention to have other polymerizable unsaturated comonomers present during the polymerization in amounts preferably not to exceed 15 weight percent of the total styrene plus comonomer, provided such comonomer, for example, $\alpha$-methylstyrene, vinyl toluene, ethyl acrylate, butyl acrylate, acrylonitrile, is not of such nature or of such quantity as to affect adversely the desired characteristics of the resulting polystyrene product.

We have found that an intimate admixture of the preformed hydrogenated polybutadiene in the styrene monomer gives best results. Although effecting polymerization in a system wherein the hydrogenated polybutadiene is merely swelled in the styrene monomer is permissible, it is best to obtain as complete a dispersion as possible, with the aid of agitation if necessary. Use of a temperature at the initiation of the process sufficiently high to effect solution of the hydrogenated polybutadiene in the styrene monomer is desirable.

In accordance with one embodiment of the invention, the polymerization of styrene containing swelled or dissolved hydrogenated polybutadiene is effected in mass, i. e., the reaction mixture consists of the monomeric material plus hydrogenated polybutadiene plus any catalyst used, and no added solvent or other reaction medium is present.

Polymerization can also be carried out by the suspension or emulsion techniques. For suspension polymerization a reaction medium such as water is used together with a small amount of a suspending agent, for example, tricalcium phosphate, to give a suspension of particles of initial reaction mixture, which particles grow in size as the polymerization proceeds yet are not of such small size as to result in a permanently stable latex. To effect emulsion polymerization, sufficient amount of emulsifying agent, for example, a water-soluble salt of a sulfonated long chain alkyl aromatic compound, is employed in suitable quantity along with vigorous agitation, whereby an emulsion of the reactants in water is formed and the product is obtained in the form of a latex. The latex can then be coagulated if desired by known methods and the polymer separated from the water. The presence of dissolved hydrogenated polybutadiene in the styrene monomer makes it more difficult to form an emulsion when practicing our invention by the emulsion polymerization technique than is the case of styrene monomer alone. However, the emulsion technique has certain advantages particularly in that a very high degree of conversion is rapidly attained.

Use of an added organic solvent during the polymerization is apt to result in too low a molecular weight product, and therefore if such a solvent is desired other conditions should be such as to result in a high molecular weight product; for example, the use of a very high pressure tends to increase the molecular weight of the product under these circumstances.

Conventional recipes and procedures for effecting mass, suspension and emulsion polymerization of styrene are so well-known to those skilled in the art, that they need not be reiterated here. Polymerization can be effected by any of the conventional procedures with suitable modifications where necessary because of the presence of the hydrogenated polybutadiene in the monomeric styrene.

Examples of polymerization procedures are given hereinafter as a guide to those skilled in the art.

Incorporation of a small amount, such as from 0.5 to 5 weight percent based on the final product, of a high molecular weight mineral oil further improves the properties of the product, particularly the tensile elongation and flexural deflection. It is preferred to limit the quantity of mineral oil to an amount sufficient to improve the flexural deflection and/or tensile elongation of the blend but insufficient to adversely affect to an important degree the heat distortion or softening temperature of the polystyrene-hydrogenated polybutadiene blend, e. g., not lower the A. S. T. M. heat distortion temperature by more than 10 to 15° C.

The most preferred method of forming an intimate mixture comprising mineral oil, hydrogenated polybutadiene and polystyrene is to incorporate both the mineral oil and pre-formed hydrogenated polybutadiene in styrene monomer and subject the resulting material to polymerization. For best results such polymerization should be carried to a high conversion, such as greater than 95 percent conversion to high molecular weight polystyrene, and at conditions also resulting in a polystyrene product having a molecular weight of 50,000 to 100,000, as determined by the Staudinger method from the specific viscosity of a very dilute solution of the polymer.

Rather than incorporate both mineral oil and hydrogenated polybutadiene in styrene monomer, styrene monomer containing pre-formed hydrogenated polybutadiene can be polymerized and the resulting polystyrene-type resin then mechanically admixed with the desired quantity of mineral oil. Or, less preferably, styrene containing mineral oil can be polymerized to polystyrene which is then mechanically mixed with hydrogenated polybutadiene in the required quantity. One simple procedure within the scope of the present invention is to form a blend by intimate mechanical admixture of polystyrene with hydrogenated polybutadiene, and add the mineral oil during or after the mechanical mixing of the two polymers. The foregoing procedures are given by way of example, and various combinations of same, or other procedures, can be employed to form a final blend containing largely polystyrene plus relatively small quantities of hydrogenated polybutadiene and of mineral oil. It will be appreciated that the different procedures discussed are not the full equivalents of each other. For example, as discussed hereinabove when pre-formed hydrogenated polybutadiene is incorporated in styrene monomer and the latter then polymerized, it is believed probable that some "graft" or "feather" polymerization occurs by union of styrene or polystyrene molecules with hydrogenated polybutadiene molecules, although it is by no means certain and is even doubtful that all molecules of the hydrogenated polybutadiene become united with one or more styrene monomer units. However, properties of blends thus formed are much superior to those formed by simple mechanical admixture. Despite the entirely different chemical nature of hydrogenated polybutadiene from polystyrene, and also the chemical nature of high molecular weight mineral oil which is entirely different from that of both polystyrene and hydrogenated polybutadiene, the products of the present invention have a high degree of homogeneity within the broad limitations discussed above, readily undergo compression or injection molding and other operations which are standard for polystyrene, and the molded products have excellent surface lustre. Our products can also be used in the form of films and monofilaments.

When the present invention is to be practiced in an embodiment which includes the use of mineral oil, the mineral oil should be of lubricating viscosity for best results; within the range of lubricating viscosities of course lies a considerable variation in actual viscosity and properties. Mineral lubricating oils are quite well-known to those skilled in the art. The mineral oil employed should be principally aliphatic hydrocarbon in character, and preferably at least 80% should have an initial boiling point of at least 300° C. corrected to atmospheric pressure. Incorporation of considerable quantities of lower molecular weight material tends to affect the physical properties of the finished product adversely. While a residual oil can be used, it is much preferred that the high molecular weight mineral oil be a distillate. The mineral oil is best obtained from petroleum sources, and the extent of paraffinicity, naphthenicity, and aromaticity will, of course, be dependent on the particular type of petroleum used as source material. However, it should be principally aliphatic-paraffinic in nature. Where opaque or colored plastics are permissible products, the high molecular weight mineral oil employed in the invention can have some color. However, where a clear product is required, the mineral oil should undergo sufficient purification treatment to be clear and essentially free from color. In some instances such treatment will involve only distillation, whereas with other types of mineral oils it may be necessary to subject the same to rigorous chemical treatment, e. g., sulfonation or aluminum chloride treatment, and/or treatment with adsorbents, in order to obtain a clear mineral oil, which treatments will also serve to remove most or all of any aromatic hydrocarbons present.

Among high molecular weight mineral oils contemplated by the invention are those which do not yield paraffin, i. e., normally solid paraffin wax, whether or not such paraffin is contained therein, essentially comprising refined substantially paraffin-free mineral or petroleum oils. An optimum embodiment of such oil is that referred to as "liquid petrolatum." The liquid petrolatum may or may not contain paraffin, but if present, the paraffin should be present in a state whereby it is not susceptible to removal, at least under normal conditions. A suitable liquid can be defined as the oil which is obtained by the distillation of that portion of petroleum which boils between 330° C. and 390° C. and is obtained after removal of the lighter constituents of the petroleum; the distillate fraction obtained between 330° C. and 390° C. is subjected to a comprehensive purification treatment with sulphuric acid and caustic soda, followed by filtration while hot through a decolorizing carbon. On cooling said purified fraction, some solid paraffin separates out, and the liquid portion is subjected to redistillation, with that portion boiling above 360° C., being retained as the liquid petrolatum. Suitable liquid petrolatums are commercially available, for example, those sold under the trade names "Nujol" and "Fractol." While liquid petrolatum or "mineral oil" as generally available, especially when in accordance with the requirements of the U. S. Pharmacopoeia, satisfies the said details of production, it will be understood that within the scope of the present invention, a reasonable latitude as to the characteristics of the product may be contemplated. Thus, the temperature range indicated for the distillate fractions may be deviated within a reasonable scope without unduly affecting the value of the fraction for purposes of the present invention.

It is an advantage of our invention that polystyrene—normally a rigid brittle product—can be rendered tough and flexible by incorporating into it minor quantities of hydrogenated polybutadiene as described herein. Various procedures have already been described for incorporating the hydrogenated polybutadiene into the blend, and others will occur to those skilled in the art. By way of further example it can be mentioned that emulsions or solutions of polystyrene on the one hand and hydrogenated polybutadiene on the other hand can be mixed and the resulting mixed emulsions or solutions used as such in surface coatings or used in conventional manner to recover the solids content thereof. Thus recovered solids can then be further subjected to very short milling to obtain a maximum intermixing of polymers when the product is to be injection or compression molded.

The following examples are provided to illustrate some of the advantages of our invention. It will be appreciated that numerous variations from the specific details can be made without departing from the invention in its broadest aspects.

EXAMPLES

Tests were made on mechanical blends and polymerization blends of polystyrene with catalytically hydrogenated polybutadiene ("Hydropols"). These "Hydropols" were prepared by first homopolymerizing butadiene in an emulsion system to produce a rubbery polybutadiene; the latter was recovered from the emulsion and then dissolved in methylcyclohexane solvent. Hydrogenation was effected under pressure at 100 to 500° F. with a nickel hydrogenation catalyst dispersed in the polymer solution. Samples of "Hydropols" were obtained having, respectively, 35.4, 23.5, 10.5 and 4.5 percent of the unsaturation present in the starting unhydrogenated polybutadiene.

Mechanical blends

Two samples of "Hydropols," containing 35.4 and 4.5 percent residual unsaturation, respectively, were mechanically blended in concentrations of 2.5, 5, 10 and 20 percent, respectively, with polystyrene. In addition, similar 2.5 percent "Hydropol" concentrations were prepared containing 1.5 and 3 percent, respectively, Nujol mineral oil.

Physical test specimens were prepared by compression molding after the blends had been thoroughly homogenized on hot (174° C.) Thropp mill rolls. After conditioning a minimum of 24 hours at 50 percent humidity, tensile and flexural measurements were made using A. S. T. M. procedures. Impact strength was measured by the Izod method on notched ⅛ inch x ½ inch x 2½ inch micro flexural bars. Data are presented in Tables I and II below. In the mechanical blends, those containing the hydrogenated polybutadiene of 35.4 percent residual unsaturation appear to possess generally better properties than those made from the hydrogenated polybutadiene containing 4.5 percent residual unsaturation.

Polymerization blends

Tests on blends duplicating those discussed above under the heading "Mechanical blends" were made in which the "Hydropols" were dispersed in styrene monomer which was then subjected to polymerization. Blends made in this manner are termed herein "polymerization blends."

Polymerization blends of styrene and "Hydropols" (partially hydrogenated polybutadiene) were prepared as follows: Selected concentrations of styrene and the "Hydropols" discussed above containing 35.4, 23.5, 10.5 and 4.5 percent, respectively, unsaturation, were sealed in glass tubes (40 gram charges) in the absence of catalyst. The mixtures were polymerized by placing the tubes in a 120° C. oil bath for 24 hours followed by 8 hours at 180° C. The tubes were removed from the initial polymerization bath and the reactants mixed thoroughly by shaking the tubes every 20 minutes during the first 8 hours. The resultant polymer was ground, milled, and compression-molded under conditions identical with those used for the corresponding mechanical blends. From data assembled in Tables I and II, the following conclusions were drawn, regarding physical properties of the polymerization blends versus mechanical blends:

(1) At equivalent concentrations the polymerization blends exhibited significantly higher impact strengths than the mechanical blends.

(2) In overall physical properties the polymerization blends were superior to the mechanical blends despite a lower-than-normal molecular weight as indicated by specific viscosity and alcohol-soluble content data.

(3) The compatibility range of the four styrene/"Hydropol" polymerization polyblends was greater than the compatibility range of corresponding mechanical blends (from strength, elongation and flexural data).

(4) The tensile elongation and flexural deflection of both mechanical blends and polymerization blends were significantly improved by the incorporation of the mineral oil.

Injection-molded test samples were made of polymerization-type blends prepared in larger batches. These larger batches containing 93.5 percent styrene, 5.0% of the particular "Hydropol" and 1.5 percent Nujol mineral oil were polymerized at a time-temperature cycle of 45 hours at 120° C., followed by 4 hours at 180° C. The TABLE I.—PHYSICAL PROPERTY COMPARISON OF STYRENE/"HYDROPOL" POLYBLENDS (MECHANICAL BLENDS vs POLYMERIZATION BLENDS)

[Test samples compression molded]

| Composition | | | | Type of Blend | Specific Viscosity [2] | | Percent Alcohol Soluble Content | Clash-Berg [5] | | | Impact Strength,[4] Ft.Lbs./In. Notch | Flexural [1] | | Tensile [1,3] | |
|---|---|---|---|---|---|---|---|---|---|---|---|---|---|---|---|
| Percent S | Percent H | Percent U | Percent N | | Orig. | ASC | | °C., $T_f$ | °C., $T_{2000}$ | °C., SR | | Strength, p.s.i. | Deflec. (in.) | Strength, p.s.i. | Elong., Percent |
| 100.0 | 0.0 | -- | -- | ---- | .113 | .110 | 2.42 | 87.5 | 102.4 | 14.9 | 0.18 | 8,787 | 0.08 | 4,047 | 3.2 |
| 97.5 | 2.5 | 4.5 | -- | M | .099 | .097 | 1.86 | 93.5 | 106.0 | 12.5 | 0.19 | 10,940 | 0.14 | 4,859 | 3.3 |
| 97.5 | 2.5 | 4.5 | -- | P | .082 | .084 | 2.61 | 89.5 | 101.3 | 11.8 | 0.27 | 9,578 | 0.12 | 3,573 | 5.0 |
| 95.0 | 5.0 | 4.5 | -- | M | .099 | .098 | 1.76 | 91.3 | 105.0 | 13.7 | 0.25 | 13,504 | 0.25 | 5,720 | 5.8 |
| 95.0 | 5.0 | 4.5 | -- | P | .078 | .080 | 2.31 | 89.0 | 102.0 | 13.0 | 0.27 | 9,337 | 0.13 | 4,382 | 5.0 |
| 90.0 | 10.0 | 4.5 | -- | M | .096 | .099 | 1.82 | 90.0 | 105.0 | 15.0 | 0.17 | 7,499 | 0.12 | 2,434 | 4.2 |
| 90.0 | 10.0 | 4.5 | -- | P | .077 | .078 | 3.16 | 87.1 | 103.0 | 15.9 | 0.26 | 8,824 | 0.14 | 4,194 | 4.1 |
| 80.0 | 20.0 | 4.5 | -- | M | .089 | .102 | 1.93 | 87.0 | 101.0 | 14.0 | 0.36 | 8,192 | 0.24 | 4,135 | 5.0 |
| 80.0 | 20.0 | 4.5 | -- | P | Not run due to lack of sufficient material | | | | | | | | | | |
| 96.0 | 2.5 | 4.5 | 1.5 | M | .091 | .095 | [6] 1.94 | 88.5 | 101.0 | 12.5 | 0.21 | 9,722Y | 0.52 | 4,575 | 5.0 |
| 96.0 | 2.5 | 4.5 | 1.5 | P | .078 | .083 | [6] 3.63 | 81.4 | 94.0 | 12.6 | 0.44 | 9,404Y | 0.26 | 4,251 | 6.6 |
| 94.5 | 2.5 | 4.5 | 3.0 | M | .093 | .094 | [6] 1.72 | 82.5 | 97.0 | 14.5 | 0.24 | 8,359Y | 0.38 | 3,948 | 5.0 |
| 94.5 | 2.5 | 4.5 | 3.0 | P | .077 | .083 | [6] 4.03 | 81.6 | 95.7 | 14.1 | 0.56 | 8,141Y | 0.30 | 3,656 | 5.8 |

*Test data explanations and key*

Abbreviations:
S—styrene
H—"Hydropol"
U—unsaturation of Hydropol
Y—indicates yield
M—mechanical blend
P—polymerization blend
N—Nujol, a high molecular weight mineral lubricating oil meeting U. S. P. standards for internal use
$T_f$—initial flex. temp. (135,000 p. s. i. modulus)
$T_{2000}$—upper flex. temp. (2,000 p. s. i. modulus)

[1] No yield points.
[2] Specific viscosities were run in 0.1% solutions of xylene at 210° on the original material and the alcohol soluble residue (ASC).
[3] Tensile test run at 25° C., relative humidity of 50%, and a crosshead speed of 0.2"/min.
[4] Impact strength obtained using Izod impact tester with values recorded as ft. lbs./in. of notch.
[5] Clash-Berg data from twist modulus (p. s. i.) on standard Clash-Berg machine using 5° C. temp. rise per 2.5 min. of running time.
[6] Exclusive of Nujol.

materials were then injection-molded, all test specimens being made under identical temperatures and pressures, and tested. The results indicated (see Table III) that of the four samples tested (35.4, 23.5, 10.5 and 4.5 percent unsaturation, respectively), the one containing the lowest amount of unsaturation gave the highest impact strength. A notched impact strength of 3 ft. lbs. was obtained on this sample despite lower than normal molecular weight.

It may be noted that improved physical properties, attributable to higher molecular weight, were obtained by increasing the initial polymerization period at 120° C. from 24 hours to 45 hours, followed by 4 hours at 180° C.

Stability on aging is greatest in polyblends made from

TABLE II(A).—PHYSICAL PROPERTY COMPARISON OF STYRENE/"HYDROPOL" BLENDS (MECHANICAL BLENDS vs. POLYMERIZATION BLENDS)

[Test samples compression molded]

| Composition | | | | Type of Blend | Specific viscosity [2] | | Percent Alcohol Soluble Content | Clash-Berg [5] | | | Impact Strength,[4] Ft.Lbs./ In. Notch | Flexural [1] | |
|---|---|---|---|---|---|---|---|---|---|---|---|---|---|
| Percent S | Percent H | Percent U | Percent N | | Orig. | ASC | | °C., $T_f$ | °C., $T_{2000}$ | °C., SR | | Strength, p.s.i. | Deflec. (in.) |
| 97.5 | 2.5 | 35.4 | ---- | M | .097 | .097 | 2.16 | 91.5 | 103.5 | 12.0 | 0.38 | 7,539 | 0.10 |
| 97.5 | 2.5 | 35.4 | ---- | P | .080 | .084 | 3.33 | 87.5 | 98.2 | 10.7 | 0.44 | 11,492Y | 0.18 |
| 95.0 | 5.0 | 35.4 | ---- | M | .096 | .094 | 2.13 | 92.0 | 104.5 | 12.5 | 0.35 | 9,064 | 0.13 |
| 95.0 | 5.0 | 35.4 | ---- | P | .070 | .079 | 3.41 | 82.3 | 99.2 | 16.9 | 0.55 | 11,104Y | 0.26 |
| 90.0 | 10.0 | 35.4 | ---- | M | .103 | .099 | 1.72 | 93.0 | 105.5 | 12.5 | 0.52 | 8,828Y | 0.28 |
| 90.0 | 10.0 | 35.4 | ---- | P | .065 | .065 | 3.61 | 82.5 | 99.9 | 17.4 | 0.76 | 9,527Y | 0.42 |
| 80.0 | 20.0 | 35.4 | ---- | M | .102 | .106 | 1.89 | 90.2 | 105.0 | 14.8 | 0.51 | 8,610Y | 0.30 |
| 80.0 | 20.0 | 35.4 | ---- | P | Not run due to lack of sufficient material | | | | | | | | |
| 96.0 | 2.5 | 35.4 | 1.5 | M | .093 | .095 | [6] 2.33 | 88.6 | 101.1 | 12.5 | 0.40 | 9,683Y | 0.38 |
| 96.0 | 2.5 | 35.4 | 1.5 | P | .071 | .081 | [6] 4.50 | 76.6 | 93.5 | 16.9 | 0.46 | 8,742Y | 0.43 |
| 94.5 | 2.5 | 35.4 | 3.0 | M | .088 | .095 | [6] 2.49 | 82.8 | 96.3 | 13.5 | 0.34 | 9,314Y | 0.35 |
| 94.5 | 2.5 | 35.4 | 3.0 | P | .074 | .084 | [6] 6.19 | 70.9 | 88.0 | 17.1 | 0.49 | 7,943Y | 0.62 |

See Table II(B) for tensile strength data.
Test data explanations and key (see table I).

TABLE II(B).—PHYSICAL PROPERTY COMPARISON OF STYRENE/"HYDROPOL" BLENDS (MECHANICAL BLENDS vs. POLYMERIZATION BLENDS)

[Test samples compression molded]

| Composition | | | | Type of Blend | Tensile | | | |
|---|---|---|---|---|---|---|---|---|
| | | | | | Yield | | Failure | |
| Percent S | Percent H | Percent U | Percent N | | Strength, p.s.i. | Elong., Percent | Strength, p.s.i. | Elong., Percent |
| 97.5 | 2.5 | 35.4 | ---- | M | -------- | ------ | 4,638 | 5.0 |
| 97.5 | 2.5 | 35.4 | ---- | P | -------- | ------ | 3,587 | 5.8 |
| 95.0 | 5.0 | 35.4 | ---- | M | -------- | ------ | 5,130 | 5.0 |
| 95.0 | 5.0 | 35.4 | ---- | P | -------- | ------ | 5,109 | 6.6 |
| 90.0 | 10.0 | 35.4 | ---- | M | -------- | ------ | 4,866 | 5.0 |
| 90.0 | 10.0 | 35.4 | ---- | P | -------- | ------ | 4,377 | 9.9 |
| 80.0 | 20.0 | 35.4 | ---- | M | -------- | ------ | 2,340 | 5.0 |
| 80.0 | 20.0 | 35.4 | ---- | P | See Table II(A) | | | |
| 96.0 | 2.5 | 35.4 | 1.5 | M | -------- | ------ | 4,772 | 5.2 |
| 96.0 | 2.5 | 35.4 | 1.5 | P | 3,854 | 5.8 | 3,502 | 8.3 |
| 94.5 | 2.5 | 35.4 | 3.0 | M | 4,184 | 5.0 | 3,714 | 7.5 |
| 94.5 | 2.5 | 35.4 | 3.0 | P | 3,771 | 7.5 | 3,549 | 8.4 |

TABLE III.—PHYSICAL PROPERTY DATA ON STYRENE/"HYDROPOL" POLYMERIZATION TYPE POLYBLENDS

[Test samples injection molded at 135° C.]

| Composition | Tensile | | | | Impact Strength, Ft. Lbs./ In. of Notch |
|---|---|---|---|---|---|
| | Yield | | Failure | | |
| | Strength, p.s.i. | Elong., Percent | Strength, p.s.i. | Elong., Percent | |
| 93.5 Styrene<br>1.5 Nujol<br>5.0 Hydropol<br>(35.4% Unsaturation) | 5,511 | 7.2 | 4,350 | 11.0 | 1.45 |
| 93.5 Styrene<br>1.5 Nujol<br>5.0 Hydropol<br>(23.5% Unsaturation) | 3,728 | 6.6 | 3,592 | 53.7 | 1.63 |
| 93.5 Styrene<br>1.5 Nujol<br>5.0 Hydropol<br>(10.5% Unsaturation) | 3,843 | 6.1 | 3,419 | 30.9 | 1.94 |
| 93.5 Styrene<br>1.5 Nujol<br>5.0 Hydropol<br>(4.5% Unsaturation) | 5,384 | 7.1 | 3,609 | 9.6 | 3.00 |

"Hydropols" of lowest residual unsaturation, presumably because they are less subject to oxidation deterioration.

Products of this invention are especially useful in making injection molded and compression molded articles, and can also be used in other forms, for example films, surface coatings, and monofilaments. They can be mixed with other materials such as pigments, plasticizers, natural and synthetic resins, fillers and the like.

While the invention has been described herein with particular reference to various preferred embodiments thereof, and numerous examples have been given of suitable proportions and conditions, it will be appreciated that variations from the details given herein can be effected without departing from the invention in its broadest aspects.

We claim:

1. Styrene polymer containing from 1 to 30 weight percent (based on total product) of a material prepared by catalytically hydrogenating a rubbery polymer of a monomeric material comprising an aliphatic conjugated diolefin hydrocarbon containing from 4 to 6 carbon atoms per molecule to a residual unsaturation of from 1 to 50 percent that in the unhydrogenated rubbery polymer.

2. Styrene polymer containing from 1 to 30 weight percent (based on total product) of rubbery polybutadiene catalytically hydrogenated to a residual unsaturation of from 1 to 50 percent that in the unhydrogenated polybutadiene.

References Cited in the file of this patent

UNITED STATES PATENTS

| | | |
|---|---|---|
| 2,046,160 | Graves | June 30, 1936 |
| 2,282,002 | Scott et al. | May 5, 1942 |

FOREIGN PATENTS

| | | |
|---|---|---|
| 593,072 | Great Britain | Oct. 8, 1947 |